Nov. 30, 1954     T. LODE     2,695,994
SUPERVISED SIGNALING SYSTEM
Filed June 25, 1952
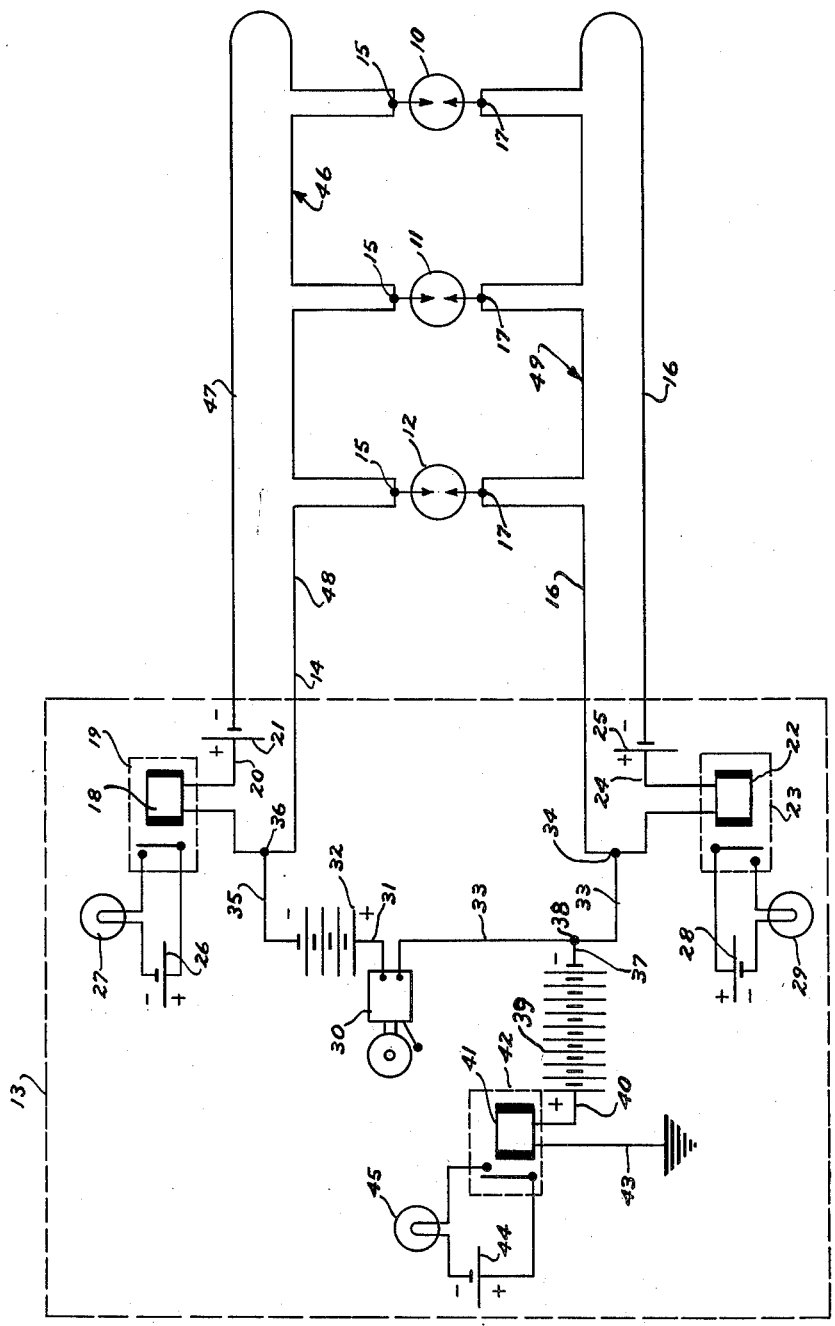
INVENTOR.
*TENNY LODE*
BY
*Braddock and Braddock*
          *ATTORNEYS*

United States Patent Office 2,695,994
Patented Nov. 30, 1954

2,695,994

SUPERVISED SIGNALING SYSTEM

Tenny Lode, St. Paul, Minn., assignor to General Sonics Corporation, Minneapolis, Minn., a corporation of Minnesota Application June 25, 1952, Serial No. 295,459

6 Claims. (Cl. 340—213)

This invention has relation to signalling systems used as fire alarms, burglar alarms, etc. In such a system, remotely located, normally electrically open detector units are connected by suitable wires to a warning device which operates when one of the detector units becomes electrically closed.

In order to afford maximum protection, such a system must be so constructed that any break or dislocation in the wiring will be immediately indicated at some central location. It is also desirable that the circuit remain in operation as a signalling system when some portion of the wiring has been broken or otherwise disturbed.

The present invention embodies these features and has the further advantage that while various dislocations and breaks in the system are indicated at a central location, there is no switching or changing of wires needed to accomplish continuous operation of the system as an alarm.

In a device made according to the present invention, a first continuous wire loop extends outwardly from an alarm bell and battery in series to one side of each of a number of detector units and a second continuous wire loop extends from said battery outwardly to an opposite side of said detector units. Means is provided for supervising these loops to determine that they are continuous and means is provided for indicating when any of the wires of the system become grounded.

In the accompanying drawing forming a part of this specification, the figure is a schematic view showing a specific embodiment of the invention.

The numeral 10 denotes a detector unit having normally open electrical contacts which is located at a point where detection is to take place. This unit can be a thermostatic unit having contacts which become closed in the presence of heat to indicate a fire, it can be a unit having contacts which close in the presence of an unauthorized intruder to indicate a breakin, or it can be any one of a number of different types of normally open units which become closed to cause a signal to be transmitted.

Other similar detector units are denoted 11 and 12 respectively. A central control box 13 may be located within sound and sight of a watchman. A first wire loop 14 extends outwardly from said central control box 13 and is attached to one terminal 15 of each of said detector units 10, 11, and 12. A second wire loop 16 extends outwardly from said control box 13 and attaches to each of the detector units at an opposite terminal 17. One end of the first wire loop 14 is connected to a coil 18 of the relay 19 while a wire 20 extends from the coil 18 to a battery 21. The other side of the battery 21 is connected to the opposite end of the wire loop 14.

Wire loop 16 is connected on one end to a coil 22 of a relay 23. A wire 24 extends from said coil 22 to a battery 25 and the battery 25 is connected to the opposite end of the wire loop 16. Relays 19 and 23 are normally closed so that the contacts thereof will remain open only while sufficient current is flowing in the coils 18 and 22 respectively. The two contacts of the relay 19 are connected in series with a battery 26 and an indicator light 27. The two contacts of the relay 23 are connected in series with a battery 28 and an indicator light 29.

Alarm bell 30 is connected by a wire 31 to a battery 32 and by a wire 33 to the second wire loop 16 at terminal 34. The battery 32 is connected by wire 35 to the first wire loop 14 at terminal 36. A wire 37 extends from a terminal 38 on the wire 33 to a battery 39. A wire 40 extends from said battery 39 to coil 41 of a relay 42. A wire 43 extends from said coil 41 to ground. Relay 42 is normally open and the contacts thereof will be closed only when sufficient current is flowing in coil 41. These contacts of the relay 42 are in series with a battery 44 and an indicator light 45.

The battery 39 and the coil 41 of the relay 42 are relatively higher in voltage and impedance respectively than the battery 32 and the coil of the alarm bell 30. The coil of the alarm bell 30 and the battery 32 are higher in impedance and voltages respectively than the coils of the relays 19 and 23 and the batteries 21 and 25. For example, the voltage of battery 39 could be 15 volts, the voltage of the battery 32 could be 6 volts and the voltage of batteries 21 and 25 could be one and a half volts each.

Normal operation

When all parts of the system are in proper position, the closing of the contacts in any one of the detector units 10, 11 or 12 will cause the alarm bell 30 to sound. Closing of the contacts in the detector unit serves to establish a continuous electrical circuit from one side of the battery 32, along wire 35 to terminal 36 and along both sides of the wire loop 14 to the terminal 15, through the detector unit to the terminal 17, along either side of the wire loop 16, through terminal 34, wire 33, through the alarm bell 30 and along wire 31 back to the battery 32. The ringing of the alarm bell 30 responsive to the closing of the contacts in the detector units is the purpose for which the system is designed.

As long as the system is in condition to operate in this manner, the three indicator lights 27, 29 and 45 will not be energized. The first supervisory circuit including first wire loop 14, battery 21, wire 20, and the coil 18 of relay 19 will have current flowing therein as long as this circuit remains intact. This holds open the relay contacts and the light 27 will not be energized.

The continuity of the second supervisory circuit including the second wire loop 16, the battery 25, wire 24, and coil 22 of relay 23 is similarly indicated by the absence of energization of indicator light 29. As long as no part of the system is grounded except the wire 43, no current will flow in coil 41 of the relay 42 and the indicator light 45 will not be energized.

Open loop operation

When the wire loop 14 becomes open for any reason, as, for example, at the point 46, the continuity of the first supervisory circuit is broken and the relay 19 will relax allowing the contacts thereof to provide a continuous circuit through the battery 26 and the indicator light 27. Energization of this light indicates that an opening exists in the first supervisory circuit.

The operation of the system as a signalling system is not affected by this opening in the wire 14. A portion of the wire loop 14 between the battery 21 and the point 46 is designated 47 and a portion of the wire loop 14 from the point 46 to the coils 18 is indicated 48. The closing of the contacts in the fire detector unit 10 will cause the alarm bell 30 to be sounded as a continuous circuit will be formed including the battery 32, wire 35, wire 48, coil 18, battery 21, wire 47, terminal 15, detector unit 10, terminal 17, second wire loop 16, wire 33, alarm bell 30 and wire 31. The current flowing in this circuit is limited by the relatively high impedance of the coil of the alarm bell and will not be sufficient to cause the coil 18 to operate the relay 19. Should either of the detector units 11 or 12 be operated to cause the contacts therein to become closed, the alarm bell 30 will ring since a circuit is formed which includes the battery 32, wire 35, wire 48, and terminal 15 of the detector unit.

Similarly, a break in the wire loop 16 as at 49 will cause the indicator light 29 to become energized but will not affect the operation of the alarm bell 30 when the contacts in any one of the detector units become closed.

Should both of the loops 14 and 16 become open at the same time, both of the indicator lights 27 and 29 would become energized and the alarm bell circuit would still operate properly in event of operation of one of the detector units.

As soon as one of the indicator lights 27 and 29 becomes energized, steps will be taken to locate the break in the wire loop and to repair it to return the system to normal operation.

Grounded operation

When any portion of the signalling system exterior of the central control box 13 becomes grounded, the indicator light 45 becomes energized. If, for example, the first loop 14 becomes grounded at the point 46 a circuit is set up from ground, through coil 41 of relay 42, wire 40, battery 39, wire 37, terminal 38, alarm bell 30, wire 31, battery 32, wire 35, terminal 36, and along either portion of the wire loop 14 back to ground. The current flowing in this circuit is limited by the relatively high impedance of the coil 41 and will not be sufficient to cause the alarm bell to sound.

In the event that the terminals of one of the detector units becomes closed, the alarm bell 30 will be caused to ring in the manner previously described.

A short to ground in the second wire loop 16 will cause the indicator light 45 to become energized and at the same time the operation of the alarm bell 30 upon operation of any of the detector units will not be affected.

Open-grounded operation

In the event that the portion 47 of the first wire loop 14 becomes grounded at 46 and the portion 48 of that wire loop becomes disconnected therefrom, the indicator light 45 will be energized since a circuit from ground through the coil 41, wire 40, battery 39, wire 37, wire 33, alarm bell 30, wire 31, battery 32, wire 35, wire 48, coil 18, battery 21, wire 47, and back to ground at point 46 would exist. Since the impedance of coil 41 is relatively high, sufficient current will not flow in coil 18 of relay 19 to prevent the contacts of said relay from becoming closed and the indicator light 27 will become operative and sufficient current will not flow in alarm bell 30 to sound that alarm.

In the event of an open-grounded loop as described above, should the detector unit 12 become closed, the alarm bell 30 would ring because of a circuit from the battery 32, wire 35, wire 48, through detector unit 12, second wire loop 16 and wire 33 back to the alarm bell.

In the event that portion 48 of first wire loop 14 becomes shorted to ground at 46 and the portion 47 of said wire loop becomes detached from portion 48, the indicator light 45 would become energized because current flowing from ground, through wire 43, coil 41, wire 40, battery 39, wire 37, wire 33, alarm bell 30, wire 31, battery 32, and wire 48 back to ground at point 46. No current would flow in the coil 18 so the relay 19 would relax to cause the indicator light 27 to become energized.

Should the terminals of the detector unit 10 become closed, the alarm bell will operate because a circuit would exist through the battery 32, along wire 35, wire 48, coil 18, battery 21, wire 47, and detector unit 10 to second wire loop 16. Closing of the contacts in the detector unit 11 would also cause operation of the alarm bell since a circuit would exist through the battery 32, wire 35, portion 48 of first wire loop 14, and through detector unit 11 to the second wire loop 16.

An open-grounded condition existing in second wire loop 16 would cause the indicator lights 29 and 45 to become energized in manner similar to that just described in connection with first wire loop 14. The operation of the alarm bell 30 would not be affected.

What is claimed is:

1. A signalling system including a plurality of normally open detector units having a pair of contacts therein adapted to be closed responsive to change of condition adjacent thereto, a first wire loop connected to a first of said contacts of each of said detector units, a second wire loop connected to a second of said contacts of each of said units, first means for providing a first continuous electrical circuit including said first wire loop, said first means being operative to indicate the presence of a break in said first continuous circuit, second means for providing a second continuous circuit including said second wire loop, said second means being operative to indicate the presence of a break in said second continuous circuit, an electrically operated alarm, a source of electric energy for operating said alarm, and wires connecting said alarm and said source of electrical energy between said first and second loops.

2. The combination as specified in claim 1 and third means between said signal system and ground for indicating when any part of said system becomes grounded.

3. A signalling system including a plurality of detector units each having a pair of normally open contacts therein adapted to be closed responsive to a change of condition adjacent thereto, a first wire loop connected to a first terminal of each of said detector units, first means including a coil of a first normally closed relay and a first electric energy source in series with said first loop for indicating the presence of a break in the continuity of said first wire loop, a second wire loop connected to a second terminal of each of said detector units, second means including a coil of a second normally closed relay and a second electric energy source in series with said second loop for indicating the presence of a break in the continuity of said second wire loop, an electrically operated alarm device and a third electric energy source in series therewith connected between said first and second wire loops for indicating when at least one of said detector units becomes closed.

4. The combination as specified in claim 3, and means including a fourth electric energy source and a coil of a normally open relay connected between said signalling system and ground for indicating when any part of said signalling system becomes grounded.

5. A signalling system including a detector unit having a pair of contacts adapted to be moved between open and closed condition, and first and second circuits, said first circuit consisting of a wire loop connected to a first contact of said detector unit and first means for indicating a break in the continuity of said wire loop connected in series with said loop, said second circuit including in series said first contact, said first circuit, second means for indicating whether said contacts are in closed or open condition and a second contact of said detector unit, said first circuit normally providing more than one path for said second circuit between said first and second contacts.

6. A signalling system including a detector unit having a pair of normally open contacts therein adapted to be closed, and first and second alarm circuits, said first alarm circuit consisting of a wire loop connected to a first contact of said detector unit, a first source of electrical energy and a first electrically operated alarm device all three in a continuous loop, said second alarm circuit for indicating when said contacts become closed including in series said first contact, said first alarm circuit, a second electrically operated alarm device, a second source of electrical energy and a second contact of said detector unit, said first alarm circuit normally providing more than one path for said second alarm circuit between said first and second contacts.

References Cited in the file of this patent
UNITED STATES PATENTS

| Number | Name | Date |
|---|---|---|
| 1,229,939 | Goldstein | June 12, 1917 |
| 1,537,211 | Wootton | May 12, 1925 |
| 2,469,001 | Poitras | May 3, 1949 |